(12) United States Patent
Tanuma (10) Patent No.: US 8,475,967 B2
(45) Date of Patent: Jul. 2, 2013

(54) MEMBRANE/ELECTRODE ASSEMBLY FOR POLYMER ELECTROLYTE FUEL CELL AND PROCESS FOR PRODUCING CATHODE FOR POLYMER ELECTROLYTE FUEL CELL

(75) Inventor: Toshihiro Tanuma, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/599,425

(22) Filed: Aug. 30, 2012

(65) Prior Publication Data

US 2012/0321989 A1    Dec. 20, 2012

Related U.S. Application Data

(63) Continuation of application No. PCT/JP2011/055413, filed on Mar. 8, 2011.

(30) Foreign Application Priority Data

Mar. 19, 2010   (JP) .................................. 2010-064373

(51) Int. Cl.
*H01M 8/10* (2006.01)
(52) U.S. Cl.
USPC ............................ 429/481; 429/482; 429/483
(58) Field of Classification Search
None
See application file for complete search history.

(56) References Cited

U.S. PATENT DOCUMENTS

| | | | |
|---|---|---|---|
| 5,865,968 A * | 2/1999 | Denton et al. ................ 204/284 |
| 6,156,449 A * | 12/2000 | Zuber et al. ................... 429/480 |
| 6,350,539 B1 * | 2/2002 | Wood et al. ................... 429/450 |
| 6,572,997 B1 * | 6/2003 | Iqbal et al. ................... 429/518 |
| 8,007,953 B2 | 8/2011 | Tanuma |
| 8,202,570 B2 | 6/2012 | Tanuma |

(Continued)

FOREIGN PATENT DOCUMENTS

| | | |
|---|---|---|
| JP | 2004-221056 | 8/2004 |
| JP | 2005-174865 | 6/2005 |

(Continued)

OTHER PUBLICATIONS

International Search Report issued Jun. 7, 2011 in connection with International Application No. PCT/JP2011/055413.

*Primary Examiner* — Patrick Ryan
*Assistant Examiner* — Jose Colucci Rios
(74) *Attorney, Agent, or Firm* — Oblon, Spivak, McClelland, Maier & Neustadt, L.L.P.

(57) ABSTRACT

To provide a membrane/electrode assembly for polymer electrolyte fuel cells, capable of achieving high power generation performance under low or no humidity operation conditions, and a process for producing a cathode for polymer electrolyte fuel cells. A membrane/electrode assembly 10, comprising:

an anode 20 having a catalyst layer 22 and a gas diffusion layer 28,
a cathode 30 having a catalyst layer 32 and a gas diffusion layer 38, and
a polymer electrolyte membrane 40 interposed between the catalyst layer 22 of the anode 20 and the catalyst layer 32 of the cathode, wherein
the cathode 30 has, between the catalyst layer 32 and the gas diffusion layer 38, a first interlayer 36 comprising carbon fibers (C1) and a fluorinated ion exchange resin (F1), and a second interlayer 34 comprising carbon fibers (C2) and a fluorinated ion exchange resin (F2), in this order from the gas diffusion layer 38 side.

20 Claims, 1 Drawing Sheet

U.S. PATENT DOCUMENTS

| | | |
|---|---|---|
| 2003/0118890 A1* | 6/2003 | Wittpahl et al. ................. 429/44 |
| 2004/0115499 A1 | 6/2004 | Tani et al. |
| 2004/0201122 A1* | 10/2004 | O'Brien ........................ 264/104 |
| 2005/0084742 A1* | 4/2005 | Angelopoulos et al. ......... 429/44 |
| 2005/0214611 A1* | 9/2005 | Hommura ....................... 429/30 |
| 2007/0231696 A1* | 10/2007 | Yazami et al. .............. 429/231.7 |
| 2008/0223516 A1* | 9/2008 | Tanuma ..................... 156/306.3 |
| 2010/0055532 A1 | 3/2010 | Sasaki et al. |
| 2010/0159301 A1 | 6/2010 | Tanuma |
| 2010/0314038 A1 | 12/2010 | Tanuma |
| 2011/0039189 A1 | 2/2011 | Tanuma |

FOREIGN PATENT DOCUMENTS

| | | |
|---|---|---|
| JP | 2008-277093 | 11/2008 |
| JP | 2010-61984 | 3/2010 |
| WO | 2007/052650 | 5/2007 |

\* cited by examiner

MEMBRANE/ELECTRODE ASSEMBLY FOR POLYMER ELECTROLYTE FUEL CELL AND PROCESS FOR PRODUCING CATHODE FOR POLYMER ELECTROLYTE FUEL CELL

TECHNICAL FIELD

The present invention relates to a membrane/electrode assembly for a polymer electrolyte fuel cell and a process for producing a cathode for a polymer electrolyte fuel cell.

BACKGROUND ART

A polymer electrolyte fuel cell is, for example, a stack of a plurality of cells each comprising a membrane/electrode assembly sandwiched between two separators. The membrane/electrode assembly is one comprising an anode and a cathode each having a catalyst layer and a gas diffusion layer, and a polymer electrolyte membrane disposed between the anode and the cathode.

Reactions in the polymer electrolyte fuel cell are represented by the following formulae (R1) and (R2):

Anode: $H_2 \rightarrow 2H^+ + 2e^-$  (R1)

Cathode: $2H^+ + \frac{1}{2}O_2 + 2e^- \rightarrow H_2O$  (R2)

In the polymer electrolyte fuel cell, the reaction represented by (R2) in the cathode has been known to be a rate-determining step, and in order to accelerate the reaction, it is necessary to increase a proton concentration and an oxygen concentration in the reaction site. Accordingly, the cathode is required to have sufficient electrical conductivity and gas diffusing property. Further, in order to maintain the electrical conductivity of the cathode, highly humidified oxidant gas (air) humidified by e.g. a humidifying device is supplied to the cathode.

Further, in the cathode, water vapor is generated by the reaction, and therefore clogging of pores (flooding) by condensation of water vapor is likely to occur. Accordingly, the cathode is also required to have sufficient water drainage property.

As a membrane/electrode assembly having a cathode with good electrical conductivity, gas diffusing property and water drainage property, the following has been proposed.

(1) A membrane/electrode assembly having a carbon layer containing a fluorinated ion exchange resin and carbon nanofibers with a fiber diameter of from 1 to 1,000 nm and a fiber length of at most 1,000 μm, disposed between a catalyst layer and a gas diffusion layer of a cathode (Patent Document 1).

In recent years, in order to simplify the fuel cell system or to reduce the cost, a polymer electrolyte fuel cell is required to be operated under low humidity conditions where the relative humidity of the reaction gas (fuel gas and oxidant gas) is low and even under no humidity conditions (for example, conditions where the relative humidity of the oxidant gas supplied to a polymer electrolyte fuel cell is at most 30% at a temperature in the polymer electrolyte fuel cell).

However, in the case of the membrane/electrode assembly (1), a polymer electrolyte membrane is likely to become dry under low or no humidity conditions, whereby the electrical conductivity is likely to be insufficient, thus lowering power generation performance.

PRIOR ART DOCUMENTS

Patent Document

Patent Document 1: WO2007/052650

DISCLOSURE OF INVENTION

Technical Problem

The present invention provides a membrane/electrode assembly for a polymer electrolyte fuel cell which can secure high power generation performance under low or no humidity conditions, as compared with conventional ones, and a process for producing a cathode for a polymer electrolyte fuel cell, by which it is possible to produce a cathode which can maintain a wet state of a polymer electrolyte membrane even under low or no humidity conditions.

Solution to Problem

The membrane/electrode assembly for a polymer electrolyte fuel cell of the present invention comprises:
an anode having a catalyst layer and a gas diffusion layer,
a cathode having a catalyst layer and a gas diffusion layer, and
a polymer electrolyte membrane interposed between the catalyst layer of the anode and the catalyst layer of the cathode, wherein
the cathode has, between the catalyst layer and the gas diffusion layer, a first interlayer comprising carbon fibers (C1) and a fluorinated ion exchange resin (F1), and a second interlayer comprising carbon fibers (C2) and a fluorinated ion exchange resin (F2), in this order from the gas diffusion layer side.

The cathode is preferably one produced by a production process having the following steps (i) and (ii):
(i) a step of forming the first interlayer by coating the gas diffusion layer with a coating fluid for forming the first interlayer, containing the carbon fibers (C1) and the fluorinated ion exchange resin (F1), followed by drying,
(ii) a step of forming the second interlayer by coating the first interlayer formed in the step (i) with a coating fluid for forming the second interlayer, containing the carbon fibers (C2) and the fluorinated ion exchange resin (F2), followed by drying.

The process for producing a cathode for a polymer electrolyte fuel cell of the present invention is a process for producing a cathode having a catalyst layer and a gas diffusion layer, said cathode having, between the catalyst layer and the gas diffusion layer, a first interlayer containing carbon fibers (C1) and a fluorinated ion exchange resin (F1), and a second interlayer containing carbon fibers (C2) and a fluorinated ion exchange resin (F2), in this order from the gas diffusion layer side,
which process comprises the following steps (i) and (ii):
(i) a step of forming the first interlayer by coating the gas diffusion layer with a coating fluid for forming the first interlayer, containing the carbon fibers (C1) and the fluorinated ion exchange resin (F1), followed by drying,
(ii) a step of forming the second interlayer by coating the first interlayer formed in the step (i) with a coating fluid for forming the second interlayer, containing the carbon fibers (C2) and the fluorinated ion exchange resin (F2), followed by drying.

The mass ratio (F1/C1) of the fluorinated ion exchange resin (F1) to the carbon fibers (C1) contained in the coating fluid for forming the first interlayer is preferably from 0.5 to 1.5.

The mass ratio (F2/C2) of the fluorinated ion exchange resin (F2) to the carbon fibers (C2) contained in the coating fluid for forming the second interlayer is preferably from 0.1 to 0.5.

The carbon fibers (C1) have an average fiber diameter of preferably from 30 to 200 nm.

The carbon fibers (C2) have an average fiber diameter of preferably from 30 to 200 nm.

Advantageous Effects of Invention

The membrane/electrode assembly for a polymer electrolyte fuel cell of the present invention can secure high power generation performance under low or no humidity conditions, as compared with conventional ones.

According to the process for producing a cathode for a polymer electrolyte fuel cell of the present invention, it is possible to produce a cathode which can maintain a wet state of a polymer electrolyte membrane even under low or no humidity conditions.

DESCRIPTION OF EMBODIMENTS

In this specification, repeating units represented by the formula (U1) will be referred to as units (U1). Repeating units represented by other formulae will be referred to in the same manner.

Further, in this specification, a compound represented by the formula (M1) will be referred to as a compound (M1). Compounds represented by other formulae will be referred to in the same manner.

The repeating units in the present invention mean units derived from a monomer, formed by polymerization of the monomer. The repeating units may be units formed directly by a polymerization reaction or such that by treatment of a polymer, some of such units are converted to another structure.

The monomer in the present invention means a compound having a polymerizable carbon-carbon double bond.

The ion exchange group in the present invention means a group having e.g. $H^+$, a monovalent metal cation or an ammonium ion. The ion exchange group may, for example, be a sulfonic acid group, a sulfonimide group or a sulfonmethide group.

The precursor group in the present invention means a group which is convertible to an ion exchange group by a known treatment such as hydrolysis or treatment for conversion to an acid form. Such a precursor group may, for example, be a $-SO_2F$ group.

<Membrane/Electrode Assembly>

Figure 1:
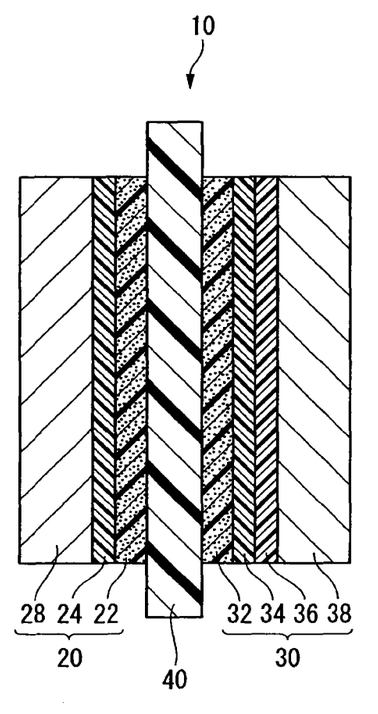
FIG. 1 is a cross-sectional view illustrating one embodiment of the membrane/electrode assembly of the present invention.

FIG. 1 is a cross-sectional view illustrating one embodiment of the membrane/electrode assembly for a polymer electrolyte fuel cell of the present invention (hereinafter referred to as a membrane/electrode assembly).

The membrane/electrode assembly 10 is one comprising an anode 20 having a catalyst layer 22, a sealing layer 24 and a gas diffusion layer 28 in this order; a cathode 30 having a catalyst layer 32, a second interlayer 34, a first interlayer 36 and a gas diffusion layer 38 in this order; and a polymer electrolyte membrane 40 disposed between the catalyst layer 22 of the anode 20 and the catalyst layer 32 of the cathode 30.

(Catalyst Layer)

The catalyst layer 22 and the catalyst layer 32 (which may be hereinafter generally referred to as a catalyst layer) are a layer comprising a catalyst and an ion exchange resin. The catalyst layer 22 and the catalyst layer 32 may be the same layers or different layers with respect to e.g. the components, composition and thickness.

The catalyst may be any catalyst so long as it is one to accelerate an oxidation/reduction reaction in a polymer electrolyte fuel cell, and it is preferably a catalyst containing platinum, particularly preferably a supported catalyst having platinum or a platinum alloy supported on a carbon carrier.

The carbon carrier may, for example, be activated carbon or carbon black, and it is preferably one graphitized by e.g. heat treatment, since its chemical durability is high.

The specific surface area of the carbon carrier is preferably at least 200 $m^2/g$. The specific surface area of the carbon carrier is measured by a BET specific surface area measuring device by adsorption of nitrogen on a carbon surface.

The platinum alloy is preferably an alloy of platinum with at least one metal selected from the group consisting of platinum group metals excluding platinum (such as ruthenium, rhodium, palladium, osmium and iridium), gold, silver, chromium, iron, titanium, manganese, cobalt, nickel, molybdenum, tungsten, aluminum, silicon, zinc and tin. Such a platinum alloy may contain an intermetallic compound of platinum and a metal to be alloyed with platinum.

The amount of platinum or a platinum alloy supported is preferably from 10 to 70 mass %, based on the supported catalyst (100 mass %).

The ion exchange resin is preferably a fluorinated ion exchange resin, more preferably a perfluorocarbon polymer having ionic groups (which may contain an etheric oxygen atom), from the viewpoint of the durability. As such a perfluorocarbon polymer, the following polymer (H) or polymer (Q) is preferred.

Polymer (H):

The polymer (H) is a copolymer having units based on tetrafluoroethylene (hereinafter referred to as TFE) and units (U1).

(U1)

wherein X is a fluorine atom or a trifluoromethyl group, m is an integer of from 0 to 3, n is an integer of from 1 to 12, and p is 0 or 1.

The polymer (H) is obtainable by polymerizing a mixture of TFE and the compound (M1) to obtain a precursor polymer, and then converting the $-SO_2F$ groups in the precursor polymer to sulfonic acid groups. The conversion of the $-SO_2F$ groups to the sulfonic acid groups is carried out by hydrolysis and is followed by conversion to an acid-form.

(M1)

wherein X is a fluorine atom or a trifluoromethyl group, m is an integer of from 0 to 3, n is an integer of from 1 to 12, and p is 0 or 1.

As the compound (M1), compounds (M1-1) to (M1-3) are preferred.

$CF_2=CFO(CF_2)_{n1}SO_2F$ (M1-1)

$CF_2=CFOCF_2CF(CF_3)O(CF_2)_{n2}SO_2F$ (M1-2)

$CF_2=CF(OCF_2CF(CF_3))_{m3}O(CF_2)_{n3}SO_2F$ (M1-3)

wherein each of n1, n2 and n3 is an integer of from 1 to 8, and m3 is an integer of from 1 to 3.

Polymer (Q):

The polymer (Q) is a copolymer having units (U2) and units (U3).

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom, and 2 when $X^1$ is a carbon atom, $Y^1$ is a fluorine atom or a monovalent perfluoro organic group, s is 0 or 1, $Q^3$ is a single bond or a perfluoroalkylene group which may have an etheric oxygen atom, $R^{f2}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom, and 2 when $X^2$ is a carbon atom, $Y^2$ is a fluorine atom or a monovalent perfluoro organic group, and t is 0 or 1.

The single bond means that the carbon atom of $CY^1$ or $CY^2$ is directly bonded to the sulfur atom of $SO_2$.

The organic group means a group containing at least one carbon atom.

Unit (U2):

In a case where the perfluoroalkylene group for $Q^1$ or $Q^2$ has an etheric oxygen atom, the number of such oxygen atoms may be one or more. Further, such an oxygen atom may be inserted in a carbon atom-carbon atom bond of the perfluoroalkylene group, or may be inserted at the terminal of a carbon atom bond.

The perfluoroalkylene group may be linear or branched, preferably linear.

The number of carbon atoms in the perfluoroalkylene group is preferably from 1 to 6, more preferably from 1 to 4. When the number of carbon atoms is at most 6, the boiling point of the fluoromonomer as the starting material tends to be low, whereby purification by distillation will be easy.

$Q^2$ is preferably a $C_{1-6}$ perfluoroalkylene group which may have an etheric oxygen atom. When $Q^2$ is a $C_{1-6}$ perfluoroalkylene group which may have an etheric oxygen atom, the polymer electrolyte fuel cell will be excellent in the stability of the power generation performance when it is operated over a long period, as compared with a case where $Q^2$ is a single bond.

It is preferred that at least one of $Q^1$ and $Q^2$ is a $C_{1-6}$ perfluoroalkylene group having an etheric oxygen atom. The fluorinated monomer having the $C_{1-6}$ perfluoroalkylene group having an etheric oxygen atom can be synthesized without a fluorination reaction by fluorine gas, whereby the yield is good, and the production is easy.

The perfluoroalkyl group for $R^{f1}$ may be linear or branched, preferably linear.

The number of carbon atoms in the perfluoroalkyl group is preferably from 1 to 6, more preferably from 1 to 4. The perfluoroalkyl group is preferably a perfluoromethyl group, a perfluoroethyl group or the like.

In a case where unit (U2) has at least two $R^{f1}$, the plurality of $R^{f1}$ may be the same or different from one another.

The $—(SO_2X^1(SO_2R^{f1})_a)^-H^+$ group is an ionic group.

The $—(SO_2X^1(SO_2R^{f1})_a)^-H^+$ group may, for example, be a sulfonic acid group ($—SO_3^-H^+$ group), a sulfonimide group ($—SO_2N(SO_2R^{f1})^-H^+$ group), or a sulfonmethide group ($—SO_2C(SO_2R^{f1})_2^-H^+$ group).

$Y^1$ is preferably a fluorine atom or a $C_{1-6}$ linear perfluoroalkyl group which may have an etheric oxygen atom.

Unit (U2) is preferably unit (U2-1), more preferably unit (U2-11), unit (U2-12) or unit (U2-13), since production of the polymer (Q) is thereby easy, and industrial application is easy.

wherein $R^{F11}$ is a single bond or a $C_{1-6}$ linear perfluoroalkylene group which may have an etheric oxygen atom, and $R^{F12}$ is a $C_{1-6}$ linear perfluoroalkylene group.

Unit (U3):

In a case where the perfluoroalkylene group for $Q^3$ has an etheric oxygen atom, the number of such oxygen atoms may be one or more. Further, such an oxygen atom may be inserted in a carbon atom-carbon atom bond of the perfluoroalkylene group, or may be inserted at the terminal of a carbon atom bond.

The perfluoroalkylene group may be liner or branched.

The number of carbon atoms in the perfluoroalkylene group is preferably from 1 to 6, more preferably from 1 to 4.

The perfluoroalkyl group for $R^{f2}$ may be linear or branched, preferably linear.

The number of carbon atoms in the perfluoroalkyl group is preferably from 1 to 6, more preferably from 1 to 4. The perfluoroalkyl group is preferably, for example, a perfluoromethyl group or a perfluoroethyl group.

The $—(SO_2X^2(SO_2R^{f2})_b)^-H^+$ group is an ionic group.

The $—(SO_2X^2(SO_2R^{f2})_b)^-H^+$ group may, for example, be a sulfonic acid group ($—SO_3^-H^+$ group), a sulfonimide group ($—SO_2N(SO_2R^{f2})^-H^+$ group), or a sulfonmethide group ($—SO_2C(SO_2R^{f2})_2^-H^+$ group).

$Y^2$ is preferably a fluorine atom or a trifluoromethyl group.

Unit (U3) is preferably unit (U3-1), more preferably unit (U3-11), unit (U3-12), unit (U3-13) or unit (U3-14) from such a viewpoint that production of the polymer (Q) is easy, and an industrial application is easy.

wherein Z is a fluorine atom or a trifluoromethyl group, m is an integer of from 0 to 3, n is an integer of from 1 to 12, and p is 0 or 1, provided that m+p>0.

Other Units:

The polymer (Q) may further have repeating units based on the after-described other monomers (hereinafter referred to as other units). The proportion of such other units may suitably be adjusted so that the ion exchange capacity of the polymer (Q) will be within the after-mentioned preferred range.

Such other units are preferably repeating units based on a perfluoromonomer, more preferably repeating units based on TFE, from the viewpoint of mechanical strength and chemical durability.

The proportion of the repeating units based on TFE is preferably at least 20 mol %, more preferably at least 40 mol %, based on the total repeating units (100 mol %) constituting the polymer (Q), from the viewpoint of the mechanical strength and chemical durability.

The proportion of the repeating units based on TFE is preferably at most 92 mol %, more preferably at most 87 mol %, based on the total repeating units (100 mol %) constituting the polymer (Q) from the viewpoint of the electrical resistance.

The polymer (Q) may have units (U2), units (U3) and other units, each being one type only, or two or more types.

The polymer (Q) is preferably a perfluoropolymer from the viewpoint of the chemical durability.

The ion exchange capacity of the fluorinated ion exchange resin is preferably from 0.5 to 2.0 meq/g dry resin, particularly preferably from 0.8 to 1.5 meq/g dry resin, from the viewpoint of the electrical conductivity and gas permeability.

The amount of platinum contained in the catalyst layer is preferably from 0.01 to 0.5 mg/cm$^2$ from the viewpoint of the optimum thickness to carry out the electrode reaction efficiently, more preferably from 0.05 to 0.35 mg/cm$^2$ from the viewpoint of the balance of the cost of materials and the performance.

The thickness of the catalyst layer is preferably at most 20 μm, more preferably from 1 to 15 μm, with a view to facilitating the gas diffusion in the catalyst layer and improving the power generation performance of the polymer electrolyte fuel cell. Further, the thickness of the catalyst layer is preferably uniform. If the thickness of the catalyst layer is made thin, the amount of the catalyst present per unit area decreases, and the reaction activity is likely to be low. In such a case, a supported catalyst may be employed wherein platinum or a platinum alloy is supported at a high supported ratio, even if the catalyst layer is thin, it is possible to maintain the reaction activity of the electrode to be high without deficiency of the catalyst amount.

The thickness of the catalyst layer is measured by observing a cross section of the catalyst layer by e.g. SEM (scanning electron microscope).

(Second Interlayer)

The second interlayer 34 is a layer containing carbon fibers (C2) and a fluorinated ion exchange resin (F2).

The carbon fibers (C2) contained in the second interlayer 34 may, for example, be carbon fibers grown in gas phase, carbon nanotubes (such as single wall, double wall, multi wall or cup-stacked type), PAN-type carbon fibers or pitch-type carbon fibers.

The carbon fibers (C2) may be in the form of chopped fibers or milled fibers.

The average fiber diameter of the carbon fibers (C2) contained in the second interlayer 34 is preferably from 30 to 200 nm, more preferably from 50 to 150 nm. When the average fiber diameter of the carbon fibers (C2) is at least 30 nm, the second interlayer 34 has good gas diffusion properties and water drainage properties. When the average fiber diameter of the carbon fibers (C2) is at most 200 nm, the carbon fibers (C2) can be dispersed well in a dispersing medium.

As the fluorinated ion exchange resin (F2) contained in the second interlayer 34, a perfluoropolymer having ion exchange groups is preferred, and the above-mentioned polymer (H) or polymer (Q) is particularly preferred. In a case where the ion exchange resin contained in the catalyst layer 32 is a fluorinated ion exchange resin, the fluorinated ion exchange resin (F2) contained in the second interlayer 34 may be the same as or different from the fluorinated ion exchange resin contained in the catalyst layer 32.

The ion exchange capacity of the fluorinated ion exchange resin (F2) is preferably from 0.5 to 2.0 meq/g dry resin, particularly preferably from 0.8 to 1.5 meq/g dry resin, from the viewpoint of the electrical conductivity and gas permeability.

The thickness of the second interlayer 34 is preferably from 5 to 30 μm, more preferably from 10 to 25 μm. When the thickness of the second interlayer 34 is at least 5 μm, carbon fibers of the gas diffusion layer 38 tend to hardly penetrate therethrough. When the thickness of the second interlayer 34 is at most 30 μm, the second interlayer 34 will have good gas diffusing properties and water drainage properties.

The thickness of the second interlayer 34 is measured by observing the cross section of the second interlayer 34 by means of e.g. SEM.

(First Interlayer)

A first interlayer 36 is a layer containing carbon fibers (C1) and a fluorinated ion exchange resin (F1).

The carbon fibers (C1) contained in the first interlayer 36 may, for example, be carbon fibers grown in gas phase, carbon nanotubes (such as single wall, double wall, multi wall or cup-stacked type), PAN-type carbon fibers or pitch-type carbon fibers.

The carbon fibers (C1) may be in the form of chopped fibers or milled fibers.

The average fiber diameter of the carbon fibers (C1) contained in the first interlayer 36 is preferably from 30 to 200 nm, more preferably from 50 to 150 nm. When the average fiber diameter of the carbon fibers (C1) is at least 30 nm, the first interlayer 36 has good gas diffusing properties and water drainage properties. When the average fiber diameter of the carbon fibers (C1) is at most 200 nm, the carbon fibers (C1) can be dispersed well in a dispersing medium.

As the fluorinated ion exchange resin (F1) contained in the first interlayer 36, a perfluoropolymer having ion exchange groups is preferred, and the above-mentioned polymer (H) or polymer (Q) is particularly preferred. The fluorinated ion exchange resin (F1) contained in the first interlayer 36 may be the same as or different from the fluorinated ion exchange resin (F2) contained in the second layer 34.

The ion exchange capacity of the fluorinated ion exchange resin (F1) is preferably from 0.5 to 2.0 meq/g dry resin, particularly preferably from 0.8 to 1.5 meq/g dry resin, from the viewpoint of the electrical conductivity and gas permeability.

The thickness of the first interlayer 36 is preferably from 5 to 30 μm, more preferably from 10 to 25 μm. When the thickness of the first interlayer 36 is at least 5 μm, carbon fibers of the gas diffusion layer 38 tend to hardly penetrate therethrough. When the thickness of the first interlayer 36 is at most 30 μm, the first interlayer 36 will have good gas diffusing properties and water drainage properties.

The thickness of the first interlayer 36 is measured by observing the cross section of the first interlayer 36 by means of e.g. SEM.

(Interlayer of Anode)

The anode 20 may have, between the catalyst layer 22 and the sealing layer 24 (between the catalyst layer 22 and the gas diffusion layer 28 when it has no sealing layer), an interlayer containing carbon fibers and a fluorinated ion exchange resin.

The carbon fibers contained in the interlayer of the anode may, for example, be carbon fibers grown in gas phase, carbon nanotubes (such as single wall, double wall, multi wall or cup-stacked type), PAN-type carbon fibers or pitch-type carbon fibers.

The carbon fibers may be in the form of chopped fibers or milled fibers.

The average fiber diameter of the carbon fibers contained in the interlayer of the anode is preferably from 30 to 200 nm, more preferably from 50 to 150 nm. When the average fiber diameter of the carbon fibers is at least 30 nm, the interlayer of the anode will have good gas diffusing properties and water drainage properties. When the average fiber diameter of the carbon fibers is at most 200 nm, the carbon fibers can be dispersed well in a dispersing medium.

As the fluorinated ion exchange resin contained in the interlayer of the anode, a perfluoropolymer having ion exchange groups is preferred, and the above-mentioned polymer (H) or polymer (Q) is particularly preferred. In a case where the ion exchange resin contained in the catalyst layer 22 is a fluorinated ion exchange resin, the fluorinated ion exchange resin contained in the interlayer of the anode may be the same as or different from the fluorinated ion exchange resin contained in the catalyst layer 22.

The ion exchange capacity of the fluorinated ion exchange resin is preferably from 0.5 to 2.0 meq/g dry resin, particularly preferably from 0.8 to 1.5 meq/g dry resin, from the viewpoint of the electrical conductivity and gas permeability.

The thickness of the interlayer of the anode is preferably from 3 to 60 μm, more preferably from 5 to 50 μm. When the thickness of the interlayer of the anode is at least 3 μm, carbon fibers of the gas diffusion layer 28 tend to hardly penetrate therethrough. When the thickness of the interlayer of the anode is at most 60 μm, the interlayer of the anode will have good gas diffusing properties and water drainage properties.

The thickness of the interlayer of the anode is measured by observing the cross section of the interlayer of the anode by means of e.g. SEM.

(Gas Diffusion Layer)

The gas diffusion layer 28 and the gas diffusion layer 38 (which may be hereinafter generally referred to as a gas diffusion layer) are a layer made of a gas diffusing base material. The gas diffusion layer 28 and the gas diffusion layer 38 may be the same layers or different layers with respect to the components, composition, thickness, etc.

The gas diffusing base material may, for example, be carbon paper, carbon cloth or carbon felt.

The thickness of the gas diffusion layer is preferably from 100 to 400 μm, more preferably from 120 to 300 μm.

For the thickness of the gas diffusion layer, thicknesses at four portions are measured by means of a Digimatic Indicator (543-250, manufactured by MITUTOYO CORPORATION, flat measuring terminal: 5 mm in diameter), and they are averaged to obtain the thickness of the gas diffusion layer.

(Sealing Layer)

The sealing layer 24 is a layer containing carbon particles and a binder. Here, the sealing layer 24 may not necessarily be provided in the anode 20. Further, the sealing layer may be provided between the second interlayer 36 and the gas diffusion layer 38 of the cathode 30.

By providing a sealing layer composed mainly of carbon particles between the catalyst layer or the interlayer and the gas diffusion layer, water tends to hardly clog pores of the gas diffusion layer, whereby it is possible to prevent deterioration of the gas diffusing properties.

The carbon particles contained in the sealing layer may, for example, be carbon black.

The binder to be contained in the sealing layer is preferably a water repellent fluoropolymer, particularly preferably a polytetrafluoroethylene (PTFE).

The sealing layer may be provided on each of the anode 20 and the cathode 30, or may be provided on one of the anode 20 and the cathode 30. In a case where one of the anode 20 and the cathode 30 has a sealing layer, and the other has no sealing layer, it is preferred that the cathode 30 has the sealing layer.

(Polymer Electrolyte Membrane)

The polymer electrolyte membrane 40 is a membrane made of an ion exchange resin.

From the viewpoint of the durability, the ion exchange resin is preferably a fluorinated ion exchange resin, more preferably a perfluorocarbon polymer having ionic groups (which may have etheric oxygen atoms), further preferably the above-mentioned polymer (H) or polymer (Q).

The ion exchange capacity of the fluorinated ion exchange resin is preferably from 0.5 to 2.0 meq/g dry resin, particularly preferably from 0.8 to 1.5 meq/g dry resin.

The thickness of the polymer electrolyte membrane 40 is preferably from 10 to 30 μm, more preferably from 15 to 25 μm. When the thickness of the polymer electrolyte membrane 40 is at most 30 μm, it is possible to prevent deterioration of the power generation performance of the polymer electrolyte fuel cell under low humidity conditions. Further, by adjusting the thickness of the polymer electrolyte membrane 40 to be at least 10 μm, it is possible to prevent gas leakage or electrical short-circuiting.

The thickness of the polymer electrolyte membrane 40 is measured by observing the cross-section of the polymer electrolyte membrane 40 by means of e.g. SEM.

(Mechanism of Action)

In the case of the membrane/electrode assembly 10 as described above, the cathode 30 has, between the catalyst layer 32 and the gas diffusion layer 38, the first interlayer 36 comprising the carbon fibers (C1) and the fluorinated ion exchange resin (F1), and the second interlayer 34 comprising the carbon fibers (C2) and the fluorinated ion exchange resin (F2), in this order from the gas diffusion layer 38 side, whereby the first interlayer 36 can maintain a wet state of the polymer electrolyte membrane 40 while quickly draining water from the catalyst layer 32 by the second interlayer 34. As a result, it is possible to sufficiently maintain the electrical conductivity of the polymer electrolyte membrane 40 even under low or no humidity conditions, and therefore the power generation performance tends to hardly deteriorate.

<Process for Producing Cathode>

The cathode 30 may be produced by the following process (I) or process (II).

Process (I): A process having the following steps (i) to (iii).

(i) A step of forming the first interlayer 36 by coating the gas diffusion layer 38 with a coating fluid for forming the first interlayer, containing the carbon fibers (C1) and the fluorinated ion exchange resin (F1), followed by drying, (ii) a step of forming the second interlayer 34 by coating the first interlayer 36 formed in the step (i) with a coating fluid for forming the second interlayer, containing the carbon fibers (C2) and the fluorinated ion exchange resin (F2), followed by drying, and (iii) a step of forming the catalyst layer 32 by coating the second interlayer 34 formed in the step (ii) with a coating fluid for forming a catalyst layer, containing a catalyst and an ion exchange resin, followed by drying, to obtain the cathode 30.

Process (II): A process having the following steps (i) to (iii').

(i) A step of forming the first interlayer 36 by coating the gas diffusion layer 38 with a coating fluid for forming the first interlayer, containing the carbon fibers (C1) and the fluorinated ion exchange resin (F1), followed by drying, (ii) a step of forming the second interlayer 34 by coating the first interlayer 36 formed in the step (i) with a coating fluid for forming the second interlayer, containing the carbon fibers (C2) and the fluorinated ion exchange resin (F2), followed by drying, and (iii') a step of sandwiching a membrane/catalyst layer assembly having catalyst layers formed on both surfaces of the polymer electrolyte membrane 40, between the gas diffusion layer 38 provided with the interlayer obtained in the step (ii) and the gas diffusion layer 28 provided with the interlayer 24 separately prepared, bonding them to obtain the membrane/electrode assembly 10, and to form the cathode 30 at the same time.

As a coating method, a known method may be applied.

A temperature for drying is preferably from 40 to 130° C., more preferably from 50 to 100° C., whereby it is possible to achieve higher power generation performance under low or no humidity conditions.

The bonding method may, for example, be a hot press method, a hot roll press method or an ultrasonic fusion method, and from the viewpoint of the in-plane uniformity, a hot press method is preferred.

The temperature of the pressing plate in the press machine is preferably from 100 to 150° C.

The pressing pressure is preferably from 0.5 to 4.0 MPa.

(Coating Fluid for Forming First Interlayer)

The coating fluid for forming the first interlayer may be one having the carbon fibers (C1) and the fluorinated ion exchange resin (F1) dispersed in a dispersing medium.

The dispersing medium is preferably a dispersing medium containing an alcohol and water. Further, a fluorinated solvent (excluding the following fluorinated alcohol) may be further added thereto.

The alcohol may, for example, be a non-fluorinated alcohol (such as methanol, ethanol, 1-propanol or 2-propanol), or a fluorinated alcohol (such as 2,2,2-trifluoroethanol, 2,2,3,3,3-pentafluoro-1-propanol, 2,2,3,3-tetrafluoro-1-propanol, 4,4,5,5,5-pentafluoro-1-pentanol, 1,1,1,3,3,3-hexafluoro-2-propanol, 3,3,3-trifluoro-1-propanol, 3,3,4,4,5,5,6,6,6-nonafluoro-1-hexanol or 3,3,4,4,5,5,6,6,7,7,8,8,8-tridecafluoro-1-octanol).

The proportion of the alcohol is preferably from 30 to 70 mass %, more preferably from 40 to 60 mass %, based on 100 mass % of the dispersing medium. When the proportion of the alcohol is within such a range, the coating properties and the dispersion stability become good.

The proportion of the water is preferably from 30 to 60 mass %, more preferably from 40 to 60 mass %, based on 100 mass % of the dispersing medium. When the proportion of the water is within such a range, the coating properties and the dispersion stability become good.

The solid content of the coating fluid for forming the first interlayer is preferably from 5 to 40 mass %, more preferably from 8 to 30 mass %, particularly preferably from 10 to 25 mass %. When the solid content is at least 5 mass %, by adjusting the viscosity of the coating fluid by the composition of the dispersing medium, it becomes possible to form the first interlayer 36 by one application. When the solid content is at most 40 mass %, the dispersed state of the carbon fibers (C1) can be maintained for a long period of time.

The solid content of the coating fluid for forming the first interlayer is represented by the proportion of the sum of the mass of the carbon fibers (C1) and the mass of the fluorinated ion exchange resin (F1) in the total mass of the coating fluid.

The mass ratio (F1/C1) of the fluorinated ion exchange resin (F1) to the carbon fibers (C1) contained in the coating fluid for forming the first interlayer is preferably from 0.5 to 1.5, more preferably from 0.5 to 1.2. When F/C is at least 0.5, the moisture retention of the first interlayer 36 increases, whereby it is possible to suppress drying of the polymer electrolyte membrane 40. When F/C is at most 1.5, it is possible to more improve the gas permeability of the first interlayer 36.

The coating fluid for forming the first interlayer may, for example, be prepared as follows.

The fluorinated ion exchange resin (F1) is dispersed in a part of the dispersing medium to prepare a dispersion of the fluorinated ion exchange resin (F1).

The carbon fibers (C1), the remaining dispersing medium and the above dispersion of the fluorinated ion exchange resin (F1) are mixed to obtain a mixed fluid. The mixed fluid is stirred to disperse the carbon fibers (C1) in the dispersing medium to obtain the coating fluid for forming a first interlayer.

At the time of stirring the mixed fluid, it is preferred to employ a homogenizer, a beads mill or the like whereby the carbon fibers (C1) will be adjusted to a proper length, and the dispersibility will thereby be improved.

(Coating Fluid for Forming Second Interlayer)

The coating fluid for forming a second interlayer may be one having the carbon fibers (C2) and the fluorinated ion exchange resin (F2) dispersed in a dispersing medium.

The dispersing medium is preferably a dispersing medium containing the above-mentioned alcohol and water. Further, a fluorinated solvent (including the above-mentioned fluorinated alcohol) may further be added thereto.

The proportion of the alcohol is preferably from 30 to 70 mass %, more preferably from 40 to 60 mass %, based on 100 mass % of the dispersing medium. When the proportion of the alcohol is within such a range, the coating properties and dispersion stability become good.

The proportion of water is preferably from 30 to 60 mass %, more preferably from 40 to 60 mass %, based on 100 mass % of the dispersing medium. When the proportion of water is within such a range, the coating properties and the dispersion stability become good.

The solid content of the coating fluid for forming the second interlayer is preferably from 5 to 40 mass %, more preferably from 8 to 30 mass %, particularly preferably from 10 to 25 mass %. When the solid content is at least 5 mass %, by adjusting the viscosity of the coating fluid by the composition of the dispersing medium, it becomes possible to form the second interlayer 34 by one application. When the solid content is at most 40 mass %, the dispersed state of the carbon fibers (C2) can be maintained for a long period of time.

The solid content of the coating fluid for forming the second interlayer is represented by the proportion of the sum of the mass of the carbon fibers (C2) and the mass of the fluorinated ion exchange resin (F2) in the total mass of the coating fluid.

The mass ratio (F2/C2) of the fluorinated ion exchange resin (F2) to the carbon fibers (C2) contained in the coating fluid for forming the second interlayer is preferably from 0.1 to 0.5, more preferably from 0.2 to 0.4. When F/C is at least 0.1, the carbon fibers can be dispersed well in a dispersing medium. When F/C is at most 0.5, the second interlayer 34 will have good gas dispersing properties and water drainage properties.

The coating fluid for forming the second interlayer is prepared in the same manner as in the coating fluid for forming the first interlayer.

(Coating Fluid for Forming Catalyst Layer)

The coating fluid for forming a catalyst layer may be one having a catalyst and a fluorinated ion exchange resin dispersed in a dispersing medium.

The dispersing medium is preferably a dispersing medium containing an alcohol and water.

The mass ratio (F/C) of the fluorinated ion exchange resin (F) to the carbon (C) in the catalyst in the coating fluid for forming a catalyst layer, is preferably from 0.4 to 1.6, particularly preferably from 0.6 to 1.2, from the viewpoint of the power generation performance of the polymer electrolyte fuel cell.

(Process for Producing Anode)

The anode 20 can be produced by a process comprising the following step (i"), and step (ii") or step (ii"').

(i") A step of coating the gas diffusion layer 28 provided with the sealing layer 24 in the anode 20, with a coating fluid for forming an interlayer of the anode, containing carbon fibers and a fluorinated ion exchange resin, followed by drying to form an interlayer of the anode.

(ii") A step of coating the sealing layer 24 (or an interlayer of the anode), with a coating fluid for forming a catalyst layer, containing a catalyst and an ion exchange resin, followed by drying, to form the catalyst layer 22, thereby to obtain the anode 20.

(ii"') A step of sandwiching a membrane/catalyst layer assembly having catalyst layers formed on both surfaces of the polymer electrolyte membrane 40, with a separately prepared gas diffusion layer 38 provided with an interlayer and the gas diffusion layer 28 provided with the sealing layer 24 (or the gas diffusion layer 28 provided with the interlayer of the anode, obtained in the step (i")), bonding them to obtain the membrane/electrode assembly 10, and to form the anode 20 at the same time.

(Coating Fluid for Forming Interlayer of Anode)

The coating fluid for forming an interlayer of the anode may be one having carbon fibers and a fluorinated ion exchange resin dispersed in a dispersing medium.

The dispersing medium is preferably a dispersing medium containing an alcohol and water.

The mass ration (F/C) of the fluorinated ion exchange resin (F) to the carbon fibers (C) contained in the coating fluid for forming an interlayer of the anode, is preferably from 0.5 to 2.0, more preferably from 0.7 to 1.5. When F/C is at least 0.5, the carbon fibers can be dispersed well in a dispersing medium. When F/C is at most 2.0, an interlayer of the anode will have good gas diffusing properties.

(Process for Producing Membrane/Electrode Assembly)

The membrane/electrode assembly 10 can be produced by the following method (I'), method (II'), method (III') or method (IV').

Method (I'): A method of sandwiching the polymer electrolyte membrane 40 between the cathode 30 and the anode 20, and bonding them to obtain the membrane/electrode assembly 10.

Method (II'): A method of sandwiching a membrane/catalyst layer assembly having catalyst layers formed on both surfaces of the polymer electrolyte membrane 40 between the gas diffusion layer 38 provided with an interlayer and the gas diffusion layer 28 provided with the sealing layer 24 (or the gas diffusion layer 28 provided with the interlayer of the anode), and bonding them to obtain the membrane/electrode assembly 10.

Method (III'): A method of coating the polymer electrolyte membrane 40 provided with the cathode 30, with a coating fluid for forming a catalyst layer, and bonding the gas diffusion layer 28 provided with the sealing layer 24 thereon, followed by drying to form the catalyst layer 24, thereby to obtain the membrane/electrode assembly 10.

Method (IV'): A method of sandwiching the polymer electrolyte membrane 40 provided with the catalyst layer 22, having the catalyst layer 22 formed thereon, followed by coating one surface of the polymer electrolyte membrane 40 with a coating fluid for forming a catalyst layer, followed by drying, between the gas diffusion layer 28 provided with the sealing layer 24 (or the gas diffusion layer 28 provided with the interlayer of the anode) and the cathode 30, and bonding them to obtain the membrane/electrode assembly 10.

(Mechanism of Action)

In the above-mentioned process for producing the cathode 30, it has the above-mentioned step (i) and step (ii), and therefore it is possible to produce the cathode 30 which can maintain a wet state of the polymer electrolyte membrane 40 even under low or no humidity conditions, from the following reasons.

That is, in the step (i), the first interlayer 36 having voids formed by the first interlayer 36 entangling of the carbon fibers (C1) one another, is formed, and then in the step (ii), is coated with the coating fluid for forming the second interlayer, whereby a part of the fluorinated ion exchange resin (F2) contained in the coating fluid for forming the second interlayer penetrates to the first interlayer 36. As a result, the proportion of the fluorinated ion exchange resin in the first interlayer 36 increases, and the moisture retention of the first interlayer 36 further increases, whereby it is possible to maintain a wet state of the polymer electrolyte membrane 40 even under low or no humidity conditions. On the other hand, the proportion of the fluorinated ion exchange resin in the second interlayer 34 decreases, whereby the gas dispersing properties and water drainage properties of the second interlayer 34 further increase.

<Polymer Electrolyte Fuel Cell>

The membrane/electrode assembly of the present invention is used for a polymer electrolyte fuel cell. A polymer electrolyte fuel cell is produced, for example, by sandwiching a membrane/electrode assembly between two separators to form a cell, and stacking a plurality of such cells.

As a separator, an electrically conductive carbon plate having grooves formed to constitute flow paths for a fuel gas or an oxidant gas containing oxygen (such as air or oxygen) may, for example, be mentioned.

As a type of the polymer electrolyte fuel cell, a hydrogen/oxygen type fuel cell or a direct methanol type fuel cell (DMFC) may, for example, be mentioned. Methanol or a methanol aqueous solution to be used as a fuel for DMFC may be a liquid feed or a gas feed.

EXAMPLES

Now, the present invention will be described in detail with reference to Examples. However, it should be understood that the present invention is by no means restricted to such specific Examples.

Examples 3 to 11 and 14 are Examples of the present invention, and Examples 1, 2, 12 and 13 are Comparative Examples.

(Polymer (H1) Dispersion (A))

Polymer (H1) (ion exchange capacity: 1.1 meq/g dry resin) comprising units based on TFE and units (U1-21), was dispersed in ethanol to prepare a polymer (H1) dispersion (A) having a solid content of 10 mass %.

(Polymer (H1) Dispersion (B))

Polymer (H1) (ion exchange capacity: 1.1 meq/g dry resin) comprising units based on TFE and repeating units (U1-21), was dispersed in a dispersing medium of ethanol/water=6/4 (mass ratio) to prepare a polymer (H1) dispersion (B) having a solid content of 27.2 mass %.

(U1-21)

<Coating Fluid for Forming Catalyst Layer>
(Coating Fluid (a1))

10.0 g of a catalyst (manufactured by Tanaka Kikinzoku Kogyo) having a platinum/cobalt alloy (platinum:cobalt=57:6 in a mass ratio) in a proportion of 63% based on the total mass of the catalyst, supported on a carbon carrier (specific surface area: 800 m$^2$/g) was added to 59.6 g of distilled water, followed by thorough stirring. Further, 62.8 g of ethanol was added, followed by thorough stirring. 29.6 g of the polymer (H1) dispersion (A) was added thereto, and mixed and pulverized by means of a planetary ball mill to prepare a coating fluid (a1).

(Coating Fluid (a2))

10.0 g of a catalyst (manufactured by Tanaka Kikinzoku Kogyo) having a platinum in a proportion of 20% based on the total mass of the catalyst, supported on a carbon carrier (specific surface area: 800 m$^2$/g) was added to 94.3 g of distilled water, followed by thorough stirring. Further, 36.7 g of ethanol was added, followed by thorough stirring. 64.0 g of the polymer (H1) dispersion (A) was added thereto, and mixed and pulverized by means of a planetary ball mill to prepare a coating fluid (a2).

<Coating Fluid for Forming Interlayer>
(Coating Fluid (c1))

30.7 g of ethanol and 47.3 g of distilled water were added to 10.0 g of carbon fibers grown in gas phase (tradename: VGCF-H, manufactured by Showa Denko K.K., average fiber diameter: about 150 nm, fiber length: 10 to 20 μm), followed by thorough stirring. Added thereto was 3.68 g of the polymer (H1) dispersion (B), followed by thorough stirring. Further, mixing and pulverizing were carried out by means of a homogenizer to obtain a coating fluid (c1).

(Coating Fluid (c2))

33.3 g of ethanol and 54.0 g of distilled water were added to 10.0 g of carbon fibers grown in gas phase (tradename: VGCF-H, manufactured by Showa Denko K.K., average fiber diameter: about 150 nm, fiber length: 10 to 20 μm), followed by thorough stirring. Added thereto was 11.03 g of the polymer (H1) dispersion (B), followed by thorough stirring. Further, mixing and pulverizing were carried out by means of a homogenizer to obtain a coating fluid (c2).

(Coating Fluid (c3))

34.6 g of ethanol and 57.3 g of distilled water were added to 10.0 g of carbon fibers grown in gas phase (tradename: VGCF-H, manufactured by Showa Denko K.K., average fiber diameter: about 150 nm, fiber length: 10 to 20 μm), followed by thorough stirring. Added thereto was 14.71 g of the polymer (H1) dispersion (B), followed by thorough stirring. Further, mixing and pulverizing were carried out by means of a homogenizer to obtain a coating fluid (c3).

(Coating Fluid (c4))

36.0 g of ethanol and 60.7 g of distilled water were added to 10.0 g of carbon fibers grown in gas phase (tradename: VGCF-H, manufactured by Showa Denko K.K., average fiber diameter: about 150 nm, fiber length: 10 to 20 μm), followed by thorough stirring. Added thereto was 18.4 g of the polymer (H1) dispersion (B), followed by thorough stirring. Further, mixing and pulverizing were carried out by means of a homogenizer to obtain a coating fluid (c4).

(Coating Fluid (c5))

37.3 g of ethanol and 64.0 g of distilled water were added to 10.0 g of carbon fibers grown in gas phase (tradename: VGCF-H, manufactured by Showa Denko K.K., average fiber diameter: about 150 nm, fiber length: 10 to 20 μm), followed by thorough stirring. Added thereto was 22.1 g of the polymer (H1) dispersion (B), followed by thorough stirring. Further, mixing and pulverizing were carried out by means of a homogenizer to obtain a coating fluid (c5).

(Coating Fluid (c6))

38.6 g of ethanol and 67.3 g of distilled water were added to 10.0 g of carbon fibers grown in gas phase (tradename: VGCF-H, manufactured by Showa Denko K.K., average fiber diameter: about 150 nm, fiber length: 10 to 20 μm), followed by thorough stirring. Added thereto was 25.7 g of the polymer (H1) dispersion (B), followed by thorough stirring. Further, mixing and pulverizing were carried out by means of a homogenizer to obtain a coating fluid (c6).

(Coating Fluid (c7))

47.9 g of ethanol and 90.6 g of distilled water were added to 10.0 g of carbon fibers grown in gas phase (tradename: VGCF-H, manufactured by Showa Denko K.K., average fiber diameter: about 150 nm, fiber length: 10 to 20 μm), followed by thorough stirring. Added thereto was 51.5 g of the polymer (H1) dispersion (B), followed by thorough stirring. Further, mixing and pulverizing were carried out by means of a homogenizer to obtain a coating fluid (c7).

(Coating Fluid (c8))

50.6 g of ethanol and 97.3 g of distilled water were added to 10.0 g of carbon fibers grown in gas phase (tradename: VGCF-H, manufactured by Showa Denko K.K., average fiber diameter: about 150 nm, fiber length: 10 to 20 μm), followed by thorough stirring. Added thereto was 58.8 g of the polymer (H1) dispersion (B), followed by thorough stirring. Further, mixing and pulverizing were carried out by means of a homogenizer to obtain a coating fluid (c8).

Example 1

The coating fluid (c2) was applied by a die coater on a gas diffusion layer base material (H2315 T10X6, manufactured by NOK Corporation) having no sealing layer so that a solid content would be 0.8 mg/cm$^2$, dried at 60° C., and further the coating fluid (a1) was applied thereon by a die coater so that the amount of platinum would be 0.2 mg/cm$^2$, followed by drying to obtain a cathode (gc1).

The coating fluid (a2) was applied on a gas diffusion layer base material having a sealing layer (25BC, manufactured by SGL carbon Group) by a die coater so that the amount of platinum would be 0.05 mg/cm$^2$, followed by drying to obtain an anode (ga1).

As a polymer electrolyte membrane, a 20 μm-thick ion exchange membrane (manufactured by Asahi Glass Company, Limited, tradename: Flemion, ion exchange capacity: 1.1 meq/g dry resin) made of a perfluorocarbon polymer having sulfonic acid groups, was prepared.

The polymer electrolyte membrane was sandwiched between the anode (ga1) and the cathode (gc1), and the catalyst layers of the anode (ga1) and the cathode (gc1) were hot pressed to the polymer electrolyte membrane to obtain a membrane/electrode assembly (electrode area: 25 cm$^2$).

(Power Generation Performance (1))

The membrane/electrode assembly obtained was assembled into a cell for power generation, and under atmospheric pressure, hydrogen (utilization ratio: 70%)/air (utilization ratio: 50%) was supplied, whereby at a cell temperature of 80° C., the cell voltage at the initial stage of the operation was measured at a current density of 1.0 A/cm$^2$. Here, on the anode side, hydrogen with a dew point of 80° C. was supplied, and on the cathode side, air with a dew point of 80° C. was supplied, to the cell (relative humidity in the cell: 100% RH). The results are shown in Table 1.

(Power Generation Performance (2))

The membrane/electrode assembly obtained was assembled into a cell for power generation, and under atmospheric pressure, hydrogen (utilization ratio: 70%)/air (utilization ratio: 50%) was supplied, whereby at a cell temperature of 80° C., the cell voltage at the initial stage of the operation was measured at a current density of 1.0 A/cm$^2$. Here, on the anode side, hydrogen with a dew point of 53° C. was supplied, and on the cathode side, air with a dew point of 53° C. was supplied, to the cell (relative humidity in the cell: 30% RH). The results are shown in Table 1.

Example 2

The coating fluid (c7) was applied on a gas diffusion layer base material (H2315 T10X6, manufactured by NOK Corporation) having no sealing layer, by a die coater, so that a solid content would be 0.8 mg/cm$^2$, dried at 60° C., and further the coating fluid (a1) was applied thereon by a die coater so that the amount of platinum would be 0.2 mg/cm$^2$, followed by drying to obtain a cathode (gc2).

In the same manner as in Example 1 except that the cathode (gc2) was used instead of the cathode (gc1), a membrane/electrode assembly was obtained to evaluate the power generation performances (1) and (2). The results are shown in Table 1.

Example 3

The coating fluid (c3) was applied by a die coater on a gas diffusion layer base material (H2315 T10X6, manufactured by NOK Corporation) having no sealing layer so that a solid content would be 0.8 mg/cm$^2$, dried at 60° C., then the coating fluid (c3) was applied thereon by a die coater so that a solid content would be 0.8 mg/cm$^2$, dried at 60° C., and further the coating fluid (a1) was applied thereon by a die coater so that the amount of platinum would be 0.2 mg/cm$^2$, followed by drying to obtain a cathode (gc3).

In the same manner as in Example 1 except that the cathode (gc3) was used instead of the cathode (gc1), a membrane/electrode assembly was obtained to evaluate the power generation performances (1) and (2). The results are shown in Table 1.

Example 4

The coating fluid (c8) was applied by a die coater on a gas diffusion layer base material (H2315 T10X6, manufactured by NOK Corporation) having no sealing layer so that a solid content would be 0.8 mg/cm$^2$, dried at 60° C., the coating fluid (c3) was applied thereon by a die coater so that a solid content would be 0.8 mg/cm$^2$, dried at 60° C., and further the coating fluid (a1) was applied thereon by a die coater so that the amount of platinum would be 0.2 mg/cm$^2$, followed by drying to obtain a cathode (gc4).

In the same manner as in Example 1 except that the cathode (gc4) was used instead of the cathode (gc1), a membrane/electrode assembly was obtained to evaluate the power generation performances (1) and (2). The results are shown in Table 1.

Example 5

The coating fluid (c6) was applied by a die coater on a gas diffusion layer base material (H2315 T10X6, manufactured by NOK Corporation) having no sealing layer so that a solid content would be 0.8 mg/cm$^2$, dried at 60° C., then the coating fluid (c5) was applied thereon by a die coater so that a solid content would be 0.8 mg/cm$^2$, dried at 60° C., and further the coating fluid (a1) was applied thereon by a die coater so that the amount of platinum would be 0.2 mg/cm$^2$, followed by drying to obtain a cathode (gc5).

In the same manner as in Example 1 except that the cathode (gc5) was used instead of the cathode (gc1), a membrane/electrode assembly was obtained to evaluate the power generation performances (1) and (2). The results are shown in Table 1.

Example 6

The coating fluid (c6) was applied by a die coater on a gas diffusion layer base material (H2315 T10X6, manufactured by NOK Corporation) having no sealing layer so that a solid content would be 0.8 mg/cm$^2$, dried at 60° C., then the coating fluid (c1) was applied thereon by a die coater so that a solid content would be 0.8 mg/cm$^2$, dried at 60° C., and further the coating fluid (a1) was applied thereon by a die coater so that the amount of platinum would be 0.2 mg/cm², followed by drying to obtain a cathode (gc6).

In the same manner as in Example 1 except that the cathode (gc6) was used instead of the cathode (gc1), a membrane/electrode assembly was obtained to evaluate the power generation performances (1) and (2). The results are shown in Table 1.

Example 7

The coating fluid (c6) was applied by a die coater on a gas diffusion layer base material (H2315 T10X6, manufactured by NOK Corporation) having no sealing layer so that a solid content would be 0.8 mg/cm², dried at 60° C., then the coating fluid (c4) was applied thereon by a die coater so that a solid content would be 0.8 mg/cm², dried at 60° C., and further the coating fluid (a1) was applied thereon by a die coater so that the amount of platinum would be 0.2 mg/cm², followed by drying to obtain a cathode (gc7).

In the same manner as in Example 1 except that the cathode (gc7) was used instead of the cathode (gc1), a membrane/electrode assembly was obtained to evaluate the power generation performances (1) and (2). The results are shown in Table 1.

Example 8

The coating fluid (c7) was applied by a die coater on a gas diffusion layer base material (H2315 T10X6, manufactured by NOK Corporation) having no sealing layer so that a solid content would be 0.8 mg/cm², dried at 60° C., then the coating fluid (c2) was applied thereon by a die coater so that a solid content would be 0.8 mg/cm², dried at 60° C., and further the coating fluid (a1) was applied thereon by a die coater so that the amount of platinum would be 0.2 mg/cm², followed by drying to obtain a cathode (gc8).

In the same manner as in Example 1 except that the cathode (gc8) was used instead of the cathode (gc1), a membrane/electrode assembly was obtained to evaluate the power generation performances (1) and (2). The results are shown in Table 1.

Example 9

The coating fluid (c5) was applied by a die coater on a gas diffusion layer base material (H2315 T10X6, manufactured by NOK Corporation) having no sealing layer so that a solid content would be 0.8 mg/cm², dried at 60° C., then the coating fluid (c2) was applied thereon by a die coater so that a solid content would be 0.8 mg/cm², dried at 60° C., and further the coating fluid (a1) was applied thereon by a die coater so that the amount of platinum would be 0.2 mg/cm², followed by drying to obtain a cathode (gc9).

In the same manner as in Example 1 except that the cathode (gc9) was used instead of the cathode (gc1), a membrane/electrode assembly was obtained to evaluate the power generation performances (1) and (2). The results are shown in Table 1.

Example 10

The coating fluid (c6) was applied by a die coater on a gas diffusion layer base material (H2315 T10X6, manufactured by NOK Corporation) having no sealing layer so that a solid content would be 1.0 mg/cm², dried at 60° C., then the coating fluid (c2) was applied thereon by a die coater so that a solid content would be 1.0 mg/cm², dried at 60° C., and further the coating fluid (a1) was applied thereon by a die coater so that the amount of platinum would be 0.2 mg/cm², followed by drying to obtain a cathode (gc10).

In the same manner as in Example 1 except that the cathode (gc10) was used instead of the cathode (gc1), a membrane/electrode assembly was obtained to evaluate the power generation performances (1) and (2). The results are shown in Table 1.

Example 11

The coating fluid (c6) was applied by a die coater on a gas diffusion layer base material (H2315 T10X6, manufactured by NOK Corporation) having no sealing layer so that a solid content would be 0.8 mg/cm², dried at 60° C., then the coating fluid (c2) was applied thereon by a die coater so that a solid content would be 0.8 mg/cm², dried at 60° C., and further the coating fluid (a1) was applied thereon by a die coater so that the amount of platinum would be 0.2 mg/cm², followed by drying to obtain a cathode (gc11).

In the same manner as in Example 1 except that the cathode (gc11) was used instead of the cathode (gc1), a membrane/electrode assembly was obtained to evaluate the power generation performances (1) and (2). The results are shown in Table 1.

Example 12

The coating fluid (c2) was applied by a die coater on a gas diffusion layer base material (H2315 T10X6, manufactured by NOK Corporation) having no sealing layer so that a solid content would be 1.6 mg/cm², dried at 60° C., and further the coating fluid (a1) was applied thereon by a die coater so that the amount of platinum would be 0.2 mg/cm², followed by drying to obtain a cathode (gc12).

In the same manner as in Example 1 except that the cathode (gc12) was used instead of the cathode (gc1), a membrane/electrode assembly was obtained to evaluate the power generation performances (1) and (2). The results are shown in Table 1.

Example 13

The coating fluid (c7) was applied by a die coater on a gas diffusion layer base material (H2315 T10X6, manufactured by NOK Corporation) having no sealing layer so that a solid content would be 1.6 mg/cm², dried at 60° C., and further the coating fluid (a1) was applied thereon by a die coater so that the amount of platinum would be 0.2 mg/cm², followed by drying to obtain a cathode (gc13).

In the same manner as in Example 1 except that the cathode (gc13) was used instead of the cathode (gc1), a membrane/electrode assembly was obtained to evaluate the power generation performances (1) and (2). The results are shown in Table 1.

Example 14

The coating fluid (c6) was applied by a die coater on a gas diffusion layer base material (H2315 T10X6, manufactured by NOK Corporation) having no sealing layer so that a solid content would be 1.0 mg/cm², dried at 150° C., then the coating fluid (c2) was applied thereon by a die coater so that a solid content would be 1.0 mg/cm², dried at 150° C., and further the coating fluid (a1) was applied thereon by a die coater so that the amount of platinum would be 0.2 mg/cm², followed by drying to obtain a cathode (gc14). In the same manner as in Example 1 except that the cathode (gc14) was used instead of the cathode (gc1), a membrane/electrode assembly was obtained to evaluate the power generation performances (1) and (2). The results are shown in Table 1.

TABLE 1

| | First interlayer F1/C1 | Second interlayer F2/C2 | Power generation performance (1) Cell voltage [mV] 100% RH | Power generation performance (2) Cell voltage [mV] 30% RH |
|---|---|---|---|---|
| Ex. 1 | — | 0.3 | 675 | 525 |
| Ex. 2 | 1.4 | — | 605 | 590 |
| Ex. 3 | 0.4 | 0.4 | 675 | 620 |
| Ex. 4 | 1.6 | 0.4 | 660 | 600 |
| Ex. 5 | 0.7 | 0.6 | 640 | 620 |
| Ex. 6 | 0.7 | 0.1 | 665 | 630 |
| Ex. 7 | 0.7 | 0.5 | 670 | 630 |
| Ex. 8 | 1.4 | 0.3 | 665 | 620 |
| Ex. 9 | 0.6 | 0.3 | 680 | 620 |
| Ex. 10 | 0.7 | 0.3 | 684 | 636 |
| Ex. 11 | 0.7 | 0.3 | 680 | 625 |
| Ex. 12 | — | 0.3 | 670 | 550 |
| Ex. 13 | 1.4 | — | 600 | 575 |
| Ex. 14 | 0.7 | 0.3 | 670 | 580 |

Industrial Applicability

The membrane/electrode assembly of the present invention is useful as a membrane/electrode assembly for a polymer electrolyte fuel cell which is operable under wide conditions.

This application is a continuation of PCT Application No. PCT/JP2011/055413, filed on Mar. 8, 2011, which is based upon and claims the benefit of priority from Japanese Patent Application No. 2010-064373 filed on Mar. 19, 2010. The contents of those applications are incorporated herein by reference in its entirety.

| REFERENCE SYMBOLS | |
|---|---|
| 10 | Membrane/electrode assembly |
| 20 | Anode |
| 22 | Catalyst layer |
| 24 | Sealing layer |
| 28 | Gas diffusion layer |
| 30 | Cathode |
| 32 | Catalyst layer |
| 34 | Second interlayer |
| 36 | First interlayer |
| 38 | Gas diffusion layer |
| 40 | Polymer electrolyte membrane |

What is claimed is:

1. A membrane/electrode assembly for a polymer electrolyte fuel cell, comprising:
   an anode having a catalyst layer and a gas diffusion layer,
   a cathode having a catalyst layer and a gas diffusion layer, and
   a polymer electrolyte membrane interposed between the catalyst layer of the anode and the catalyst layer of the cathode, wherein
   the cathode has, between the catalyst layer and the gas diffusion layer, a first interlayer comprising carbon fibers (C1) and a fluorinated ion exchange resin (F1), and a second interlayer comprising carbon fibers (C2) and a fluorinated ion exchange resin (F2), in this order from the gas diffusion layer side.

2. The membrane/electrode assembly for a polymer electrolyte fuel cell according to claim 1, wherein the carbon fibers (C1) have an average fiber diameter of from 30 to 200 nm.

3. The membrane/electrode assembly for a polymer electrolyte fuel cell according to claim 1, wherein the carbon fibers (C2) have an average fiber diameter of from 30 to 200 nm.

4. The membrane/electrode assembly for a polymer electrolyte fuel cell according to claim 1, wherein the cathode is one produced by a production process having the following steps (i) and (ii):
   (i) a step of forming the first interlayer by coating the gas diffusion layer with a coating fluid for forming the first interlayer, containing the carbon fibers (C1) and the fluorinated ion exchange resin (F1), followed by drying,
   (ii) a step of forming the second interlayer by coating the first interlayer formed in the step (i) with a coating fluid for forming the second interlayer, containing the carbon fibers (C2) and the fluorinated ion exchange resin (F2), followed by drying.

5. The membrane/electrode assembly for a polymer electrolyte fuel cell according to claim 4, wherein the mass ratio (F1/C1) of the fluorinated ion exchange resin (F1) to the carbon fibers (C1) contained in the coating fluid for forming the first interlayer is from 0.5 to 1.5.

6. The membrane/electrode assembly for a polymer electrolyte fuel cell according to claim 4, wherein the mass ratio (F2/C2) of the fluorinated ion exchange resin (F2) to the carbon fibers (C2) contained in the coating fluid for forming the second interlayer is from 0.1 to 0.5.

7. A process for producing a cathode for a polymer electrolyte fuel cell, having a catalyst layer and a gas diffusion layer, said cathode having, between the catalyst layer and the gas diffusion layer, a first interlayer containing carbon fibers (C1) and a fluorinated ion exchange resin (F1), and a second interlayer containing carbon fibers (C2) and a fluorinated ion exchange resin (F2), in this order from the gas diffusion layer side,
   which process comprises the following steps (i) and (ii):
   (i) a step of forming the first interlayer by coating the gas diffusion layer with a coating fluid for forming the first interlayer, containing the carbon fibers (C1) and the fluorinated ion exchange resin (F1), followed by drying,
   (ii) a step of forming the second interlayer by coating the first interlayer formed in the step (i) with a coating fluid for forming the second interlayer, containing the carbon fibers (C2) and the fluorinated ion exchange resin (F2), followed by drying.

8. The process for producing a cathode for a polymer electrolyte fuel cell according to claim 7, wherein the mass ratio (F1/C1) of the fluorinated ion exchange resin (F1) to the carbon fibers (C1) contained in the coating fluid for forming the first interlayer is from 0.5 to 1.5.

9. The process for producing a cathode for a polymer electrolyte fuel cell according to claim 7, wherein the mass ratio (F2/C2) of the fluorinated ion exchange resin (F2) to the carbon fibers (C2) contained in the coating fluid for forming the second interlayer is from 0.1 to 0.5.

10. The process for producing a cathode for a polymer electrolyte fuel cell according to claim 7, wherein the carbon fibers (C1) have an average fiber diameter of from 30 to 200 nm.

11. The process for producing a cathode for a polymer electrolyte fuel cell according to claim 7, wherein the carbon fibers (C2) have an average fiber diameter of from 30 to 200 nm.

12. The process for producing a cathode for a polymer electrolyte fuel cell according to claim 7, wherein the coating fluid for forming the first interlayer coated in the step (i) is dried at a temperature of from 40 to 130 C, and the coating fluid for forming the second interlayer coated in the step (ii) is dried at a temperature of from 40 to 130° C.

13. The membrane/electrode assembly for a polymer electrolyte fuel cell according to claim 1 wherein said cathode having a catalyst layer comprise a catalyst comprising platinum.

14. The membrane/electrode assembly for a polymer electrolyte fuel cell according to claim 13 wherein said catalyst comprises at least one catalyst selected from the group consisting of platinum supported on a carbon carrier and a platinum alloy supported on a carbon carrier.

15. The membrane/electrode assembly for a polymer electrolyte fuel cell according to claim 1, wherein said fluorinated ion exchange resin F1 comprised a copolymer having units based on tetrafluoroethylene and units (U1)

wherein X is a fluorine atom or a trifluoromethyl group, m is an integer of from 0 to 3, n is an integer of from 1 to 12, and p is 0 or 1.

16. The membrane/electrode assembly for a polymer electrolyte fuel cell according to claim 1, wherein said fluorinated ion exchange resin F1 comprises a copolymer having units (U2) and units (U3)

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom, and 2 when $X^1$ is a carbon atom, $Y^1$ is a fluorine atom or a monovalent perfluoro organic group, s is 0 or 1, $Q^3$ is a single bond or a perfluoroalkylene group which may have an etheric oxygen atom, $R^{f2}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom, and 2 when $X^2$ is a carbon atom, $Y^2$ is a fluorine atom or a monovalent perfluoro organic group, and t is 0 or 1.

17. The membrane/electrode assembly for a polymer electrolyte fuel cell according to claim 1, wherein said fluorinated ion exchange resin F2 comprised a copolymer having units based on tetrafluoroethylene and units (U1)

wherein X is a fluorine atom or a trifluoromethyl group, m is an integer of from 0 to 3, n is an integer of from 1 to 12, and p is 0 or 1.

18. The membrane/electrode assembly for a polymer electrolyte fuel cell according to claim 1, wherein said fluorinated ion exchange resin F2 comprises a copolymer having units (U2) and units (U3)

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, a is 0 when $X^1$ is an oxygen atom, 1 when $X^1$ is a nitrogen atom, and 2 when $X^1$ is a carbon atom, $Y^1$ is a fluorine atom or a monovalent perfluoro organic group, s is 0 or 1, $Q^3$ is a single bond or a perfluoroalkylene group which may have an etheric oxygen atom, $R^{f2}$ is a perfluoroalkyl group which may have an etheric oxygen atom, $X^2$ is an oxygen atom, a nitrogen atom or a carbon atom, b is 0 when $X^2$ is an oxygen atom, 1 when $X^2$ is a nitrogen atom, and 2 when $X^2$ is a carbon atom, $Y^2$ is a fluorine atom or a monovalent perfluoro organic group, and t is 0 or 1.

19. The membrane/electrode assembly for a polymer electrolyte fuel cell according to claim 1, wherein said fluorinated ion exchange resin F1 has an ion exchange capacity of 0.5 to 2.0 meq/g dry resin.

20. The membrane/electrode assembly for a polymer electrolyte fuel cell according to claim 1, wherein said fluorinated ion exchange resin F2 has an ion exchange capacity of 0.5 to 2.0 meq/g dry resin.

* * * * *